United States Patent
Usikov

(10) Patent No.: US 10,460,156 B2
(45) Date of Patent: Oct. 29, 2019

(54) AUTOMATED TRACKING AND RETAINING OF AN ARTICULATED OBJECT IN A SEQUENCE OF IMAGE FRAMES

(71) Applicant: SONY CORPORATION, Tokyo (JP)

(72) Inventor: Daniel Usikov, Newark, CA (US)

(73) Assignee: SONY CORPORATION, Tokyo (JP)

(*) Notice: Subject to any disclaimer, the term of this patent is extended or adjusted under 35 U.S.C. 154(b) by 6 days.

(21) Appl. No.: 15/913,308

(22) Filed: Mar. 6, 2018

(65) Prior Publication Data

US 2019/0278980 A1  Sep. 12, 2019

(51) Int. Cl.
*G06K 9/00* (2006.01)

(52) U.S. Cl.
CPC ............... *G06K 9/00335* (2013.01)

(58) Field of Classification Search
CPC ................................ G06K 9/00335
See application file for complete search history.

(56) References Cited

U.S. PATENT DOCUMENTS

| | | | |
|---|---|---|---|
| 9,123,133 B1 | 9/2015 | Chen et al. | |
| 9,224,211 B2 | 12/2015 | Wang et al. | |
| 9,280,831 B1* | 3/2016 | Harary | G06K 9/00442 |
| 2007/0183661 A1 | 8/2007 | El-Maleh et al. | |
| 2012/0189168 A1 | 7/2012 | El-Maleh et al. | |
| 2014/0093127 A1 | 4/2014 | Mundhenk et al. | |
| 2015/0104106 A1* | 4/2015 | Elinas | G06K 9/4638 382/201 |
| 2016/0065959 A1* | 3/2016 | Stobaugh | H04N 19/176 375/240.26 |
| 2016/0275692 A1* | 9/2016 | Raburn | G06T 7/11 |

(Continued)

FOREIGN PATENT DOCUMENTS

| | | |
|---|---|---|
| AT | 520102 T | 8/2011 |
| CN | 101375312 A | 2/2009 |
| EP | 1984896 A1 | 10/2008 |

(Continued)

OTHER PUBLICATIONS

Extended European Search Report of EP Patent Application No. 19157546.3, dated Jul. 17, 2019, 10 pages.

(Continued)

*Primary Examiner* — Tom Y Lu
(74) *Attorney, Agent, or Firm* — Chip Law Group

(57) ABSTRACT

Various aspects of an image-processing apparatus and method to track and retain an articulated object in a sequence of image frames are disclosed. The image-processing apparatus is configured to segment each image frame in the sequence of image frames into different segmented regions that corresponds to different super-pixels. An articulated object in a first motion state is detected by non-zero temporal derivatives between a first image frame and a second image frame. A first connectivity graph of a first set of super-pixels of the first image frame, is constructed. A second connectivity graph of a second set of super-pixels of the second image frame, is further constructed. A complete object mask of the articulated object in a second motion state is generated based on the first connectivity graph and the second connectivity graph, where at least a portion of the articulated object is stationary in the second motion state.

24 Claims, 9 Drawing Sheets

(56) References Cited

U.S. PATENT DOCUMENTS

2017/0337711 A1* 11/2017 Ratner ................ H04N 19/176

FOREIGN PATENT DOCUMENTS

| EP | 2378486 A1 | 10/2011 |
| EP | 2381420 A1 | 10/2011 |
| JP | 4819912 B2 | 11/2011 |
| KR | 10-2008-0100242 A | 11/2008 |
| WO | 2007/092906 A1 | 8/2007 |

OTHER PUBLICATIONS

Yeo, et al, "Superpixel-Based Tracking-by-Segmentation using Markov Chains", 2017 IEEE Conference on Computer Vision and Pattern Recognition (CVPR), Jul. 21-26, 2017, pp. 511-520.

Yilmaz, et al, "Object Tracking: A Survey", ACM Computing Surveys (CSUR), vol. 38, No. 4, Article 13, Dec. 2006, pp. 1-45.

\* cited by examiner

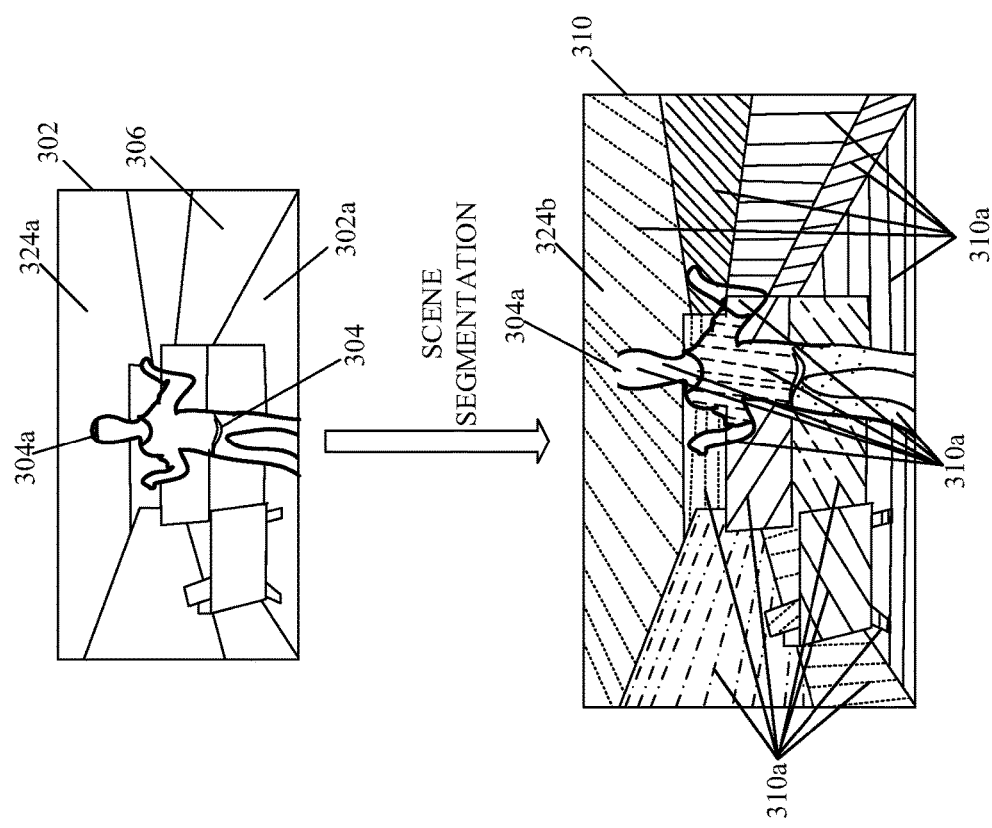

AUTOMATED TRACKING AND RETAINING OF AN ARTICULATED OBJECT IN A SEQUENCE OF IMAGE FRAMES

CROSS-REFERENCE TO RELATED APPLICATIONS/INCORPORATION BY REFERENCE

None.

FIELD

Various embodiments of the disclosure relate to object tracking technologies in a sequence of image frames. More specifically, various embodiments of the disclosure relate to an image-processing apparatus and method to track and retain an articulated object in a sequence of image frames.

BACKGROUND

Recent advancements in the field of video surveillance systems, machine vision systems in the field of robotics and automotive industry, and consumer electronic (CE) devices are largely due to rapid technological developments in image processing technologies. Although various technologies have been known for object tracking, most of them are focused on finding an object's average movement, usually from a "center of mass" of the object, in a sequence of image frames of a video. In case of an articulated object, for example, a human being, the complexities of object tracking increase as the geometrical shape of the articulated object is not constant and changes as the articulated object moves. Articulated objects refers to objects that have parts which are attached via joints, and can move with respect to one another. Articulated objects are also prone to deformation, for example, two parts of the articulated object may merge or separate over a period of time in the sequence of image frames. Current technologies usually attempt to find an articulated object's average movement, without attempting to recognize all moving parts of the articulated object. Further, a common approach to locate and segment a foreground object is to subtract a static background image from a newly captured image. The subtraction may provide temporal derivatives, and the remaining pixels after subtraction may be labeled as foreground object. However, in certain scenarios, a "fading-out" problem is encountered when the articulated object, is attempted to be tracked by use of temporal derivatives. For example, the articulated object or some parts of the articulated object may suddenly stop moving. The articulated object or the parts that stop moving leave partial or no temporal derivatives in the sequence of image frames, and the articulated object gradually disappear or fade-out. Thus, it may be difficult to accurately delineate the foreground articulated object in such scenarios.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method to track and retain an articulated object in a sequence of image frames is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3C illustrates a second exemplary scenario for implementation of the disclosed image-processing apparatus and method to track and retain an articulated object in a sequence of image frames, in accordance with an embodiment of the disclosure.

DETAILED DESCRIPTION

Figure 1A:
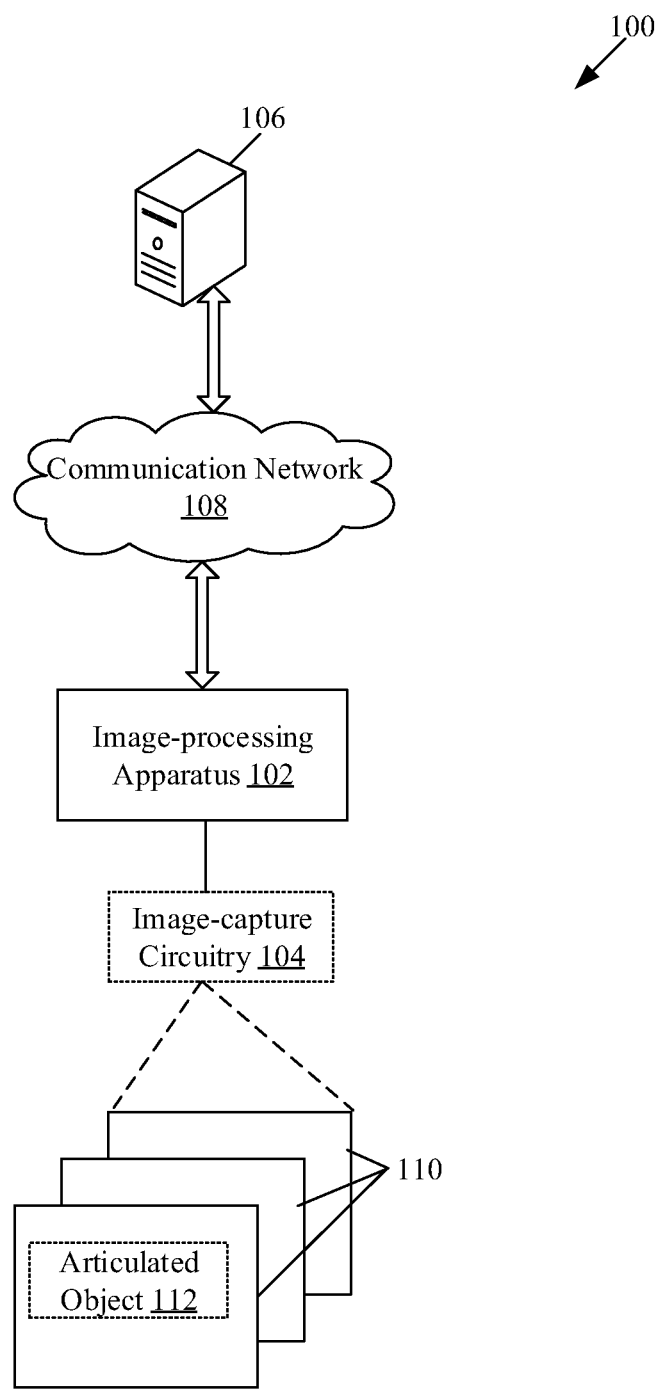
FIG. 1A is a block diagram that illustrates an exemplary network environment to track and retain an articulated object in a sequence of image frames, in accordance with an embodiment of the disclosure.

The following described implementations may be found in the disclosed image-processing apparatus and method to track and retain an articulated object in a sequence of image frames. Exemplary aspects of the disclosure may include an image-processing apparatus that may segment each image frame in the sequence of image frames into different segmented regions that corresponds to different super-pixels. An articulated object in a first motion state may be detected by non-zero temporal derivatives between a first image frame and a second image frame. The second image frame may succeed the first image frame in the sequence of image frames. The image-processing apparatus may be configured to construct a first connectivity graph of a first set of super-pixels of the first image frame. The image-processing apparatus may be further configured to construct a second connectivity graph of a second set of super-pixels of the second image frame. The image-processing apparatus may be further configured to generate a complete object mask of the articulated object in a second motion state based on the first connectivity graph and the second connectivity graph. At least a portion of the articulated object may be stationary in the second motion state.

In accordance with an embodiment, the image-processing apparatus may be configured to compare the second connectivity graph of the second image frame with the first connectivity graph of the first image frame for the generation of the complete object mask. The image-processing apparatus may be configured to compute a temporal derivative map from three sequential image frames that include the first image frame and the second image frame. The temporal derivative map may include at least the non-zero temporal derivatives.

In accordance with an embodiment, the image-processing apparatus may be configured to associate a super-pixel of the first set of super-pixels and the second set of super-pixels with the non-zero temporal derivatives. The association may be done based on a presence of the non-zero temporal derivatives in the super-pixel, which corresponds to a segmented region of the different segmented regions. The super-pixel associated with the non-zero temporal derivatives may be included entirely in the complete object mask. The image-processing apparatus may be configured to classify a super-pixel in the first set of super-pixels and the second set of super-pixels as moving based on the association of the super-pixel with the non-zero temporal derivatives.

In accordance with an embodiment, the image-processing apparatus may be configured to update a classification of a super-pixel in the second set of super-pixels as an object super-pixel that belong to the articulated object. The classification of the super-pixel may be updated based on a previous classification of the super-pixel as moving in the first image frame even if the non-zero temporal derivatives may be absent from the second image frame. In accordance with an embodiment, a super-pixel of the second set of super-pixels, may be divided into a first sub-region and a second sub-region. The super-pixel that is divided may include a first number of pixels in the first sub-region that belong to the articulated object and a second number of pixels in the second sub-region that belong to a stationary background. The first number of pixels in the first sub-region may be less than a threshold number. The image-processing apparatus may be configured to check whether a super-pixel of the second set of super-pixels, which is classified as stationary in the second image frame, is previously associated with the non-zero temporal derivatives for the division of the super-pixel. The image-processing apparatus may be configured to update segmentation parameters for the super-pixel for the division of the super-pixel into the first sub-region and the second sub-region.

In accordance with an embodiment, the image-processing apparatus may be configured to update the first connectivity graph with the second connectivity graph for each portion of the articulated object to reflect a current appearance of the articulated object in the second image frame. Each portion of the articulated object may be tracked independent of a motion state of the articulated object in the sequence of image frames, based on a combination of a temporal derivative map and the first connectivity graph and the second connectivity graph. The image-processing apparatus may be configured to restore a missing portion of the articulated object in the second image frame of the sequence of image frames for the generation of the complete object mask. The missing portion of the articulated object may be restored based on a comparison of the first connectivity graph and the second connectivity graph.

FIG. 1A is a block diagram that illustrates an exemplary network environment to track and retain an articulated object in a sequence of image frames, in accordance with an embodiment of the disclosure. With reference to FIG. 1A, there is shown a network environment 100. The network environment 100 may include an image-processing apparatus 102, an image-capture circuitry 104, a server 106, and a communication network 108. A sequence of image frames 110 may be captured by the image-capture circuitry 104. The sequence of image frames 110 may comprise an articulated object 112. The image-capture circuitry 104 may refer to an integrated camera or an external camera communicatively coupled to the image-processing apparatus 102. The image-processing apparatus 102 and the server 106 may be communicatively coupled to each other, via the communication network 108.

The image-processing apparatus 102 may comprise suitable circuitry, interfaces, and/or code that may be configured to process the sequence of image frames 110 to track an object, such as the articulated object 112, independent of different motion states of the object. The object may be accurately tracked based on a combination of a temporal derivative map and connectivity graphs of super-pixels. The image-processing apparatus 102 may be configured to dynamically segment the articulated object 112, which may be detected in the sequence of image frames 110 in real time or near-real time. Examples of the image-processing apparatus 102 may include, but are not limited to, a digital camera, a camcorder, a head-mounted device (HMD), a surveillance equipment, a smartphone, a smart-glass, a tablet, an augmented reality based device, a computing device, and/or other consumer electronic (CE) devices.

The image-capture circuitry 104 may comprise suitable logic, circuitry, interfaces, and/or code that may be configured to capture the sequence of image frames 110. The image-capture circuitry 104 may include an image-sensing circuit that may enable capture of the sequence of image frames 110. The image-capture circuitry 104 may comprise a viewfinder that may be configured to compose and/or focus a scene captured by the image-capture circuitry 104. The image-capture circuitry 104 may be configured to store the captured sequence of image frames 110 in a local buffer, a memory, and/or in the server 106.

The server 106 may comprise suitable circuitry, interfaces, and/or code that may be configured to store the sequence of image frames 110 captured by the image-processing apparatus 102. Examples of the server 106 may include, but are not limited to, a database server, a file server, an application server, a cloud server, a web server, or a combination thereof.

The communication network 108 may include a communication medium through which the image-processing apparatus 102 may be communicatively coupled with the server 106. Examples of the communication network 108 may include, but are not limited to, the Internet, a cloud network, a Wireless Fidelity (Wi-Fi) network, a Local Area Network (LAN), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, including variants and/or a combinations thereof.

The sequence of image frames 110 may refer to a video of a scene as viewed and captured by the image-capture circuitry 104. The sequence of image frames 110 may include one or more objects, such as the articulated object 112. The articulated object 112 refers to an object that have parts which are attached via joints, and can move with respect to one another. The articulated object 112 may be a moving object that may suddenly stop moving, or some parts of the articulated object 112 may stop moving over a period of time during capture of the sequence of image frames 110. The articulated object 112 may also be a deforming object whose shape over a period of time, or an object located at a same position but in a different orientation at different time instances in the captured sequence of image frames 110. Examples of the articulated object 112 may include, but are not limited to a human object, an animal, or a non-human or inanimate articulated object, such as a robot.

In operation, the image-capture circuitry 104 may be configured to capture the sequence of image frames 110. The captured sequence of image frames 110 may include one or more objects, such as the articulated object 112, and a still background. The image-processing apparatus 102 may receive the sequence of image frames 110 from the image-capture circuitry 104. The image-processing apparatus 102 may be configured to segment each image frame in the sequence of image frames 110 into different segmented regions that corresponds to different super-pixels. The segmentation refers to scene segmentation, where a scene in each image frame of the sequence of image frames 110 is segmented in a color space, for example, a RGB color space. An example of the scene segmentation, is shown in FIG. 1B.

Figure 1B:
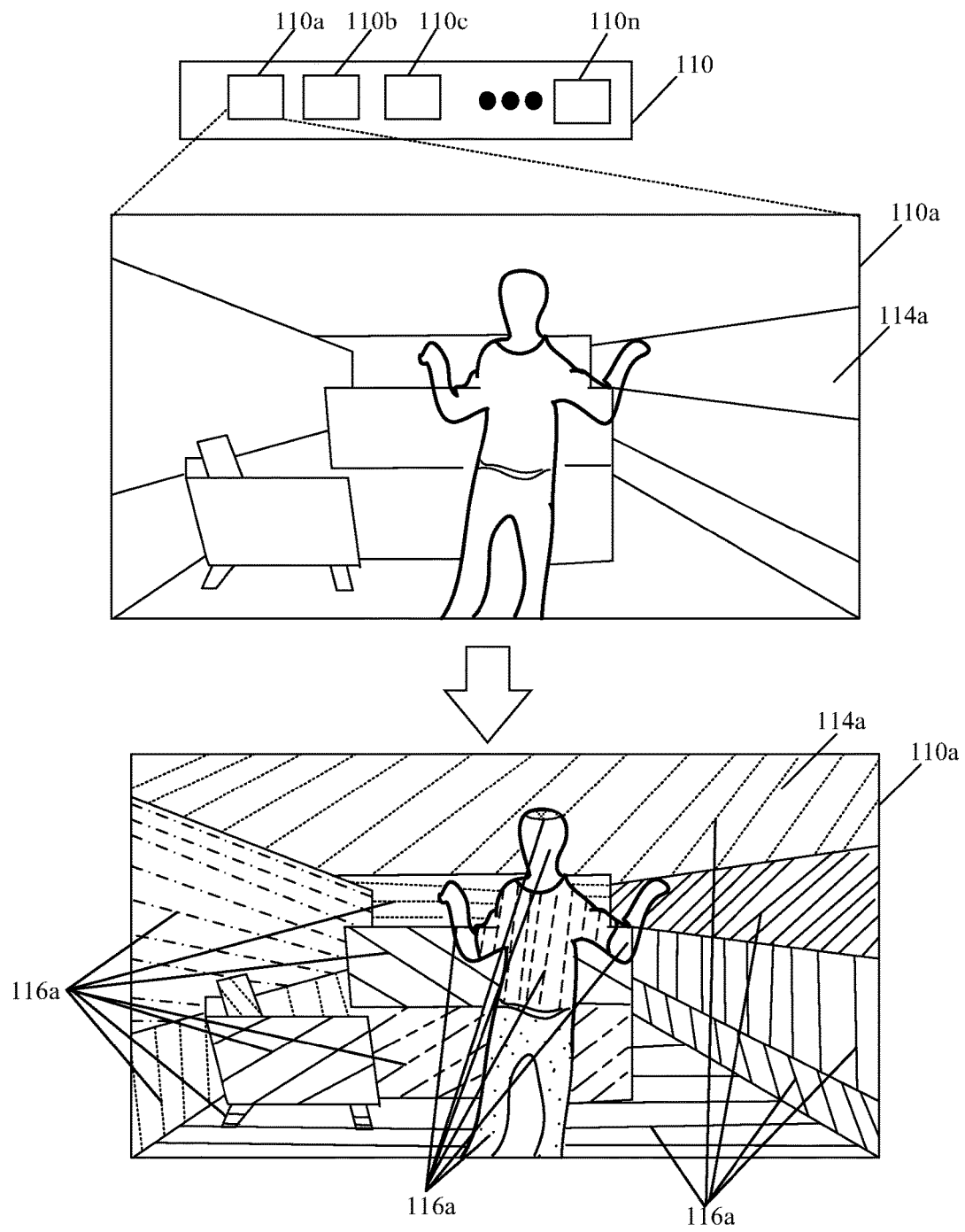
FIG. 1B illustrates an exemplary segmentation of a scene of an image frame of a sequence of image frames in a color space by the image-processing apparatus of FIG. 1A, in accordance with an embodiment of the disclosure.

FIG. 1B illustrates an exemplary segmentation of a scene of an image frame of a sequence of image frames in a color space by the image-processing apparatus of FIG. 1A, in accordance with an embodiment of the disclosure. With reference to FIG. 1B, there is shown an enlarged view of one of the sequence of image frames 110 captured by the image-capture circuitry 104. The sequence of image frames 110 may include sequential image frames, such as a first image frame 110a, a second image frame 110b, a third image frame 110c, . . . , and an nth image frame 110n. A scene 114a of the first image frame 110a and a first set of super-pixels 116a in the first image frame 110a of the sequence of image frames 110, are shown.

The first set of super-pixels 116a corresponds to different segmented regions that are a result of the scene segmentation of the source scene, such as the scene 114a. Each super-pixel may be a polygonal segmented region of a digital image (for example, each image frame of the sequence of image frames 110) comprising a group of pixels with same or similar image properties, such as brightness or color. Thus, the entire source scene, such as the scene 114a, of the first image frame 110a, may be described as a collection of super-pixels (i.e. the first set of super-pixels 116a). Each super-pixel may be represented in a pseudo color (different pseudo color are shown by different patterns in the FIG. 1B). The same segmented regions or super-pixels may be marked by a same pseudo color across the sequence of image frames 110 when a scene in each successive image frames, such as the second image frame 110b and the third image frame 110c, of the sequence of image frames 110 is segmented in a color space.

In accordance with an embodiment, the image-processing apparatus 102 may be configured to compute temporal derivatives, such as a temporal derivative map, from two sequential image frames of the sequence of image frames 110. For example, the first image frame 110a and the second image frame 110b may be converted to binary images, where a pixel may have two possible values, such as black and white. The pixel values of the second image frame 110b may be subtracted with the pixel values of the first image frame 110a to find displaced pixels. As the background is static in the sequence of image frames 110, the displaced pixels may correspond to pixels of a moving object, such as the articulated object 112. The image-processing apparatus 102 may be configured to detect the articulated object 112 in a first motion state by non-zero temporal derivatives between the first image frame 110a and the second image frame 110b. The second image frame 110b succeeds the first image frame 110a in the sequence of image frames 110.

In accordance with an embodiment, the image-processing apparatus 102 may be configured to utilize three sequential frames to compute temporal derivatives. The use of three-sequential frames may significantly reduce noise that may come from the image-capture circuitry 104, such as a RGB camera. In certain scenarios, a motion blur or a smearing may be introduced when the image-capture circuitry 104 momentarily shakes. In such cases, the smearing may be reduced even for the fast moving articulated objects by use of the three-sequential frames for computation of the temporal derivatives. In some embodiments, the shaking noise in the temporal derivatives may be eliminated by subtracting a global movement of the image-capture circuitry 104 (i.e. the camera) from the temporal derivatives. The use of temporal derivatives allows recognition of an object, such as the articulated object 112, by its movement. The object, such as the articulated object 112, may be tracked regardless of its appearance, i.e. no prior knowledge about the object is required. Usually, numerous pixels are involved in an object movement, therefore the object movement may be recognized by the use of temporal derivatives even if the object moves by a pixel.

In conventional methods, a "fading-out" problem is encountered when an attempt is made to solely track an object, such as the articulated object 112, by use of temporal derivatives. For example, the articulated object 112 or some parts of the articulated object 112 may suddenly stop moving. Alternatively stated, a motion state of the articulated object 112 may change from the first motion state to a second motion state. The first motion state corresponds to a motion state of the articulated object 112 when the articulated object 112 or all the parts of the articulated object 112 are in motion. The second motion state corresponds to a changed motion state of the articulated object 112 when the articulated object 112 or some parts of the articulated object 112 become stationary (i.e. stop moving). The articulated object 112 or the parts that stop moving leave partial or no temporal derivatives in the sequence of image frames 110, and thus the articulated object 112 may gradually disappear or fade-out during tracking, if tracking of the articulated object 112 is done solely by use of temporal derivatives.

In contrast to the conventional and common approach of motion-based tracking and object segmentation, the image-processing apparatus 102 may be configured to track each portion of the articulated object 112 independent of a motion state of the articulated object 112 in the sequence of image frames 110, based on a combination of the computed temporal derivative map and an independent scene-segmented map. The temporal derivative map may be used for motion-based object detection and association of non-zero temporal derivatives with each super-pixel. The scene-segmented map may refer to different segmented regions (such as the first set of super-pixels 116a), in which the co-relation of each segmented region (i.e. a super-pixel) with adjacent segmented regions is derivable. A connectivity pattern, such as a connectivity graph, of the different segmented regions in the scene-segmented map may be utilized for a robust tracking of each portion of the articulated object 112 in the sequence of image frames 110. For example, the image-processing apparatus 102 may be configured to construct a first connectivity graph of the first set of super-pixels 116a of the first image frame 110a. Similarly, the image-processing apparatus 102 may be configured to construct the second connectivity graph of the second set of super-pixels of the second image frame 110b. An example of the second set of super-pixels may be the set of super-pixels 310a of the image frame 302, as shown and described in the FIG. 3A.

In accordance with an embodiment, the image-processing apparatus 102 may be configured to associate a super-pixel of the second set of super-pixels with the non-zero temporal derivatives. The association may be done based on a presence of the non-zero temporal derivatives in the super-pixel, which corresponds to a segmented region of the different segmented regions. If a segmented region, such as a super-pixel, contains non-zero temporal derivatives, the segmented region as a whole (i.e. in entirety) is included into an object mask of the articulated object 112. A super-pixel in the second set of super-pixels may be classified as moving based on the association of the super-pixel with the non-zero temporal derivatives. In some embodiments, the image-processing apparatus 102 may be configured to generate an initial object boundary of the articulated object 112 from the super-pixels of the second set of super-pixels that are classified as moving based on the computed non-zero temporal derivatives. The initial object boundary of the articulated object 112 may be complete if the articulated object 112 is in the first motion state. However, the initial object boundary of the articulated object 112 may not be complete if the articulated object 112 is in the second motion state as the articulated object 112 or the parts that stop moving leave partial or no temporal derivatives.

The image-processing apparatus 102 may then be configured to compare the constructed second connectivity graph of the second image frame 110b with the first connectivity graph of the first image frame 110a. Even if some portions (or parts) of the articulated object 112 become stationary in the sequence of image frames 110, still such stationary portions may be identified based on the connectivity graphs (or connectivity pattern) analysis, and thus retained. The image-processing apparatus 102 may be configured to update a classification of a super-pixel in the second set of super-pixels as moving super-pixel that belong to the articulated object 112. The classification of the super-pixel may be updated based on a previous classification of the super-pixel as moving in the first image frame 110a or image frames that may precede the first image frame 110a (not shown).

The image-processing apparatus 102 may be configured to restore a missing portion of the articulated object 112 in the second image frame 110b of the sequence of image frames 110 based on the comparison of the first connectivity graph and the second connectivity graph. The initial object boundary of the articulated object 112 may be updated and the missing object boundaries, if any, may be rectified based on the comparison of the first connectivity graph and the second connectivity graph. The image-processing apparatus 102 may be configured to generate a complete object mask of the articulated object 112 in the second motion state based on the comparison of the first connectivity graph and the second connectivity graph. At least a portion of the articulated object 112 may be stationary in the second motion state. The image-processing apparatus 102 may then dynamically segment the detected articulated object 112 in the second image frame 110b and the subsequent image frames of the captured sequence of image frames 110 in real time or near real time. The image-processing apparatus 102 may be further configured to communicate the segmented articulated object 112 in the second image frame 110b and the subsequent image frames to the server 106, via communication network 108. The server 106 may be configured to store the segmented articulated object 112.

Figure 2:
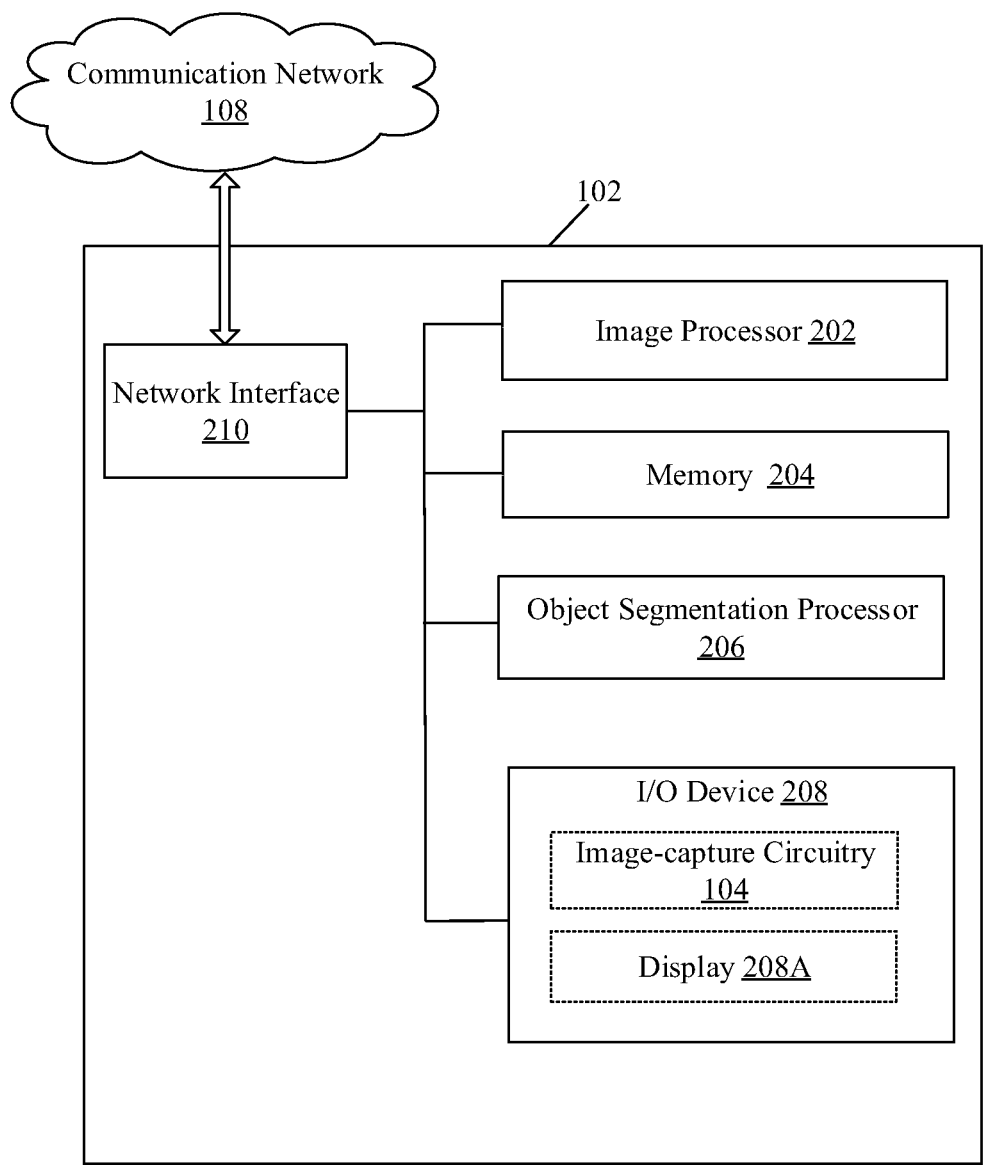
FIG. 2 is a block diagram that illustrates an exemplary image-processing apparatus, in accordance with an embodiment of the disclosure.

FIG. 2 is a block diagram that illustrates an exemplary image-processing apparatus, in accordance with an embodiment of the disclosure. FIG. 2 is explained in conjunction with elements from FIGS. 1A and 1B. With reference to FIG. 2, there is shown the image-processing apparatus 102. The image-processing apparatus 102 may include one or more circuits, such as an image processor 202, a memory 204, an object segmentation processor 206, an I/O device 208, and a network interface 210. The I/O device 208 may include the image-capture circuitry 104 and a display 208A. The image-capture circuitry 104 is shown as an integrated unit of the image-processing apparatus 102, in an example. The image processor 202 may be communicatively coupled with the memory 204, the object segmentation processor 206, the I/O device 208, the network interface 210, and the image-capture circuitry 104. The network interface 210 may facilitate communication with the server 106, via communication network 108.

The image processor 202 may comprise suitable logic, circuitry, interfaces, and/or code that may be configured to segment a scene in each image frame of the sequence of image frames 110 into different segmented regions that corresponds to different super-pixels. The different segmented regions that corresponds to different super-pixels may change in geometrical shape, color, or brightness. The tracking of different portions (also referred to as parts or segments) of the articulated object 112 may be achieved by construction of a connectivity graph of super-pixels that defines each portion (or segment) of the articulated object 112. The image processor 202 may utilize the constructed connectivity graph of super-pixels to identify adjacent portion (or segments) and their image properties (e.g. color, texture, or geometry). The connectivity graph may be updated with each new frame, reflecting the current appearance of the moving object, such as the articulated object 112, in the sequence of image frames 110. The image processor 202 may be configured to execute a set of instructions stored in the memory 204. The image processor 202 may be implemented based on a number of processor technologies known in the art. Examples of the image processor 202 may be a Reduced Instruction Set Computing (RISC) processor, an Application-Specific Integrated Circuit (ASIC) processor, a Complex Instruction Set Computing (CISC), a hardware processor, a central processing unit (CPU), and/or other processors or control circuits.

The memory 204 may comprise suitable logic, circuitry, and/or interfaces that may be configured to store a set of instructions executable by the image processor 202. The image processor 202 may store the associative information related to super-pixels that are classified as moving in processed image frames of the sequence of image frames 110 in the memory 204. The memory 204 may be configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The object segmentation processor 206 may comprise suitable logic, circuitry, interfaces, and/or code that may be configured to segment the articulated object 112 in the sequence of image frames 110 in real time, near-real time, or a small lag-time based on a complete object mask generated by the image processor 202. The object segmentation processor 206 may be further configured to store the segmented object in the memory 204. The object segmentation processor 206 may be implemented as a separate processor (such as a coprocessor), or circuitry in the image-processing apparatus 102. The object segmentation processor 206 and the image processor 202 may be implemented as an integrated processor or a cluster of processors that perform the functions for the object segmentation processor 206 and the image processor 202.

The I/O device 208 may comprise suitable logic, circuitry, interfaces, and/or code that may be configured to receive an input and provide an output to a user. The I/O device 208 may comprise various input and output devices that may be configured to communicate with the image processor 202. Examples of the input devices may include, but not limited to, a touch screen, a keyboard, a mouse, a joystick, a microphone, and/or the image-capture circuitry 104. Examples of the output devices may include, but not limited to, the display 208A and/or a speaker.

The display 208A may comprise suitable logic, circuitry, interfaces, and/or code that may be configured to render the sequence of image frames 110. In accordance with an embodiment, the display 208A may be able to receive input from the user. In such a scenario, the display 208A may be a touch screen that enables the user to provide input. The touch screen may correspond to at least one of a resistive touch screen, a capacitive touch screen, or a thermal touch screen. In accordance with an embodiment, the display 208A may receive the input through a virtual keypad, a stylus, a gesture-based input, and/or a touch-based input. The display 208A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display 208A may refer to a display screen of smart-glass device, a see-through display, a projection-based display, an electro-chromic display, and/or a transparent display. The see-through display may be a transparent or a semi-transparent display. In accordance with an embodiment, the see-through display and/or the projection-based display may generate an optical illusion that the segmented object is floating in air at a pre-determined distance from a user's eye, such as the user, thereby providing an enhanced user experience.

The network interface 210 may comprise suitable logic, circuitry, interfaces, and/or code that may be configured to facilitate communication between the image-processing apparatus 102 and the server 106, via the communication network 108. The network interface 210 may be implemented by use of various known technologies to support wired or wireless communication of the image-processing apparatus 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions and/or operations performed by the image-processing apparatus 102, as described in FIGS. 1A and 1B, may be performed by the image processor 202 and/or the object segmentation processor 206. Other operations performed by the image processor 202 and the object segmentation processor 206 are further described, for example, in the FIGS. 3A to 3C and 4A to 4C.

Figure 3A:
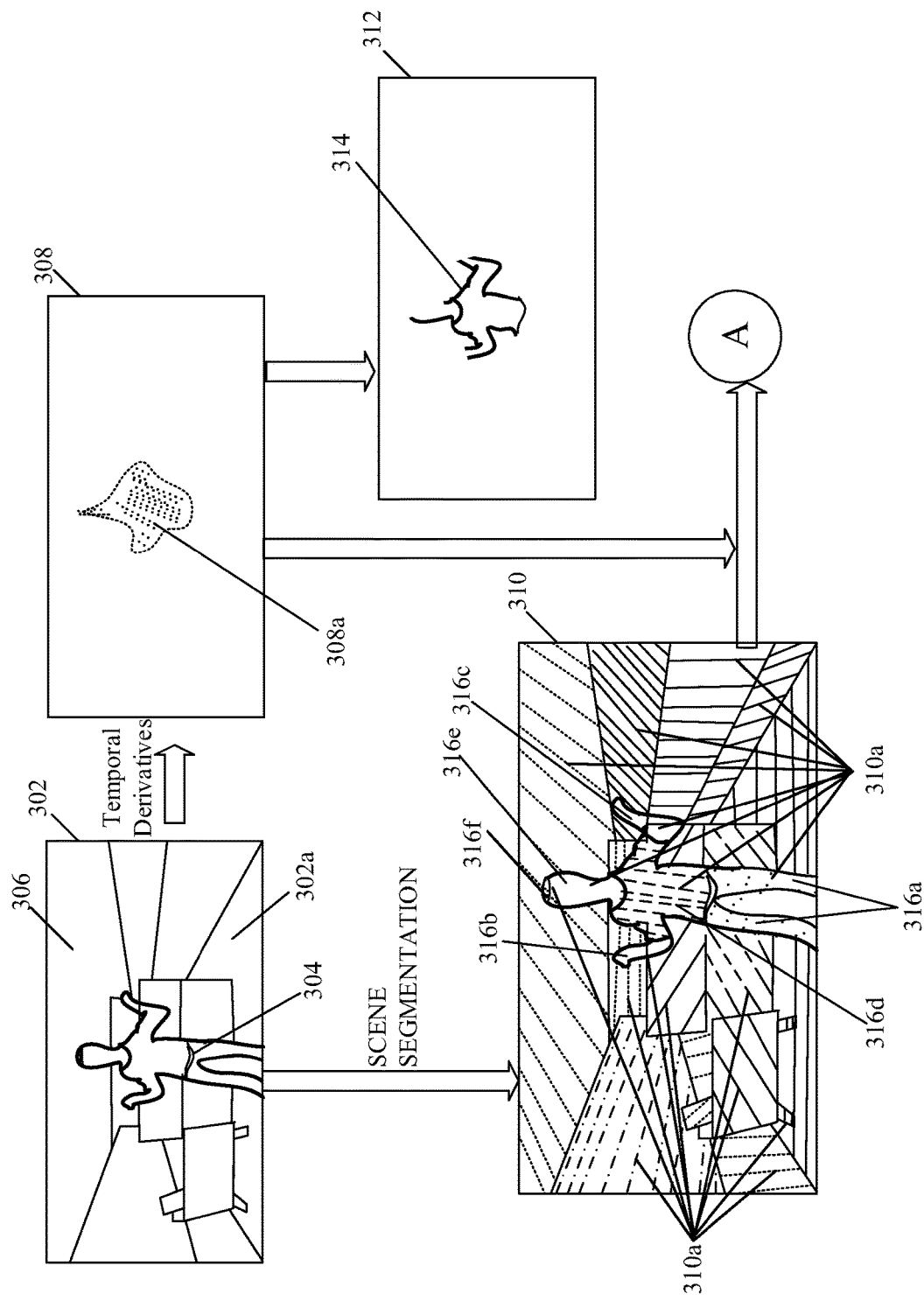
FIGS. 3A and 3B, collectively, illustrate a first exemplary scenario for implementation of the disclosed image-processing apparatus and method to track and retain an articulated object in a sequence of image frames, in accordance with an embodiment of the disclosure.
Figure 3B:
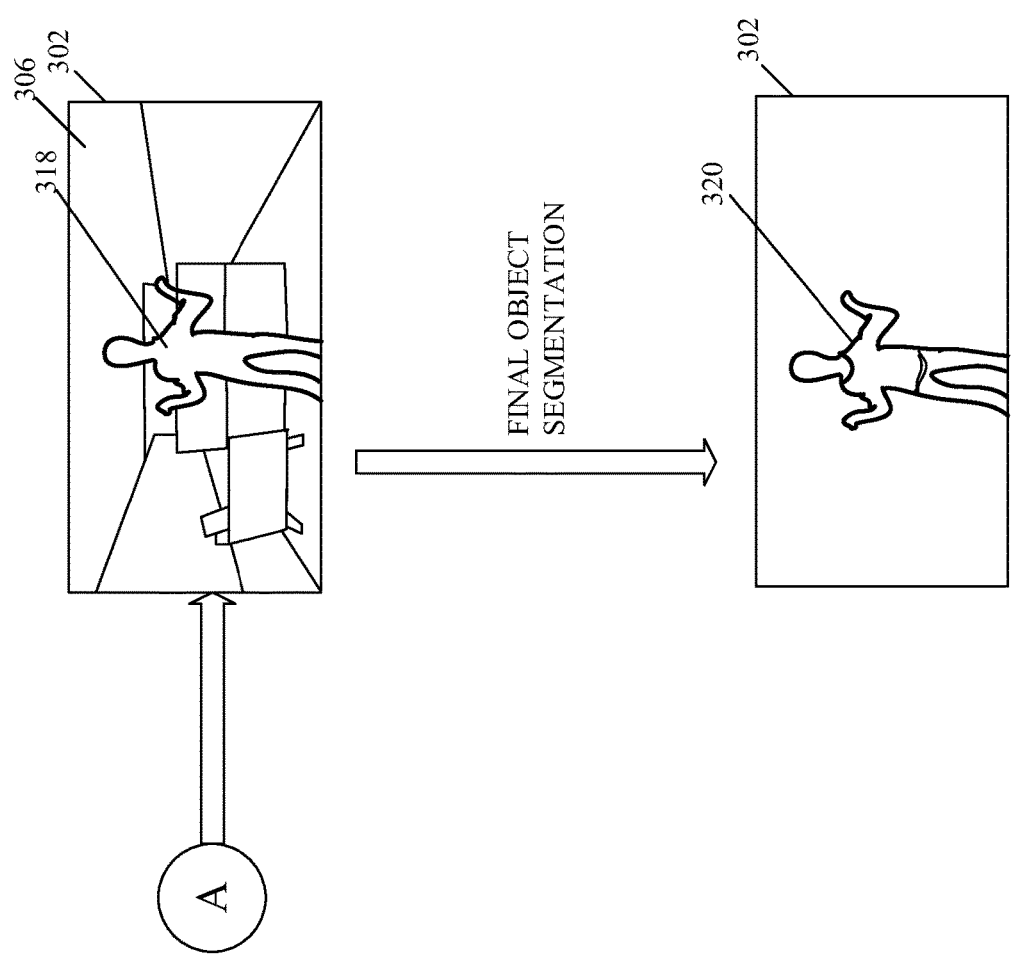

FIGS. 3A and 3B, collectively, illustrate a first exemplary scenario for implementation of the disclosed image-processing apparatus and method to track and retain an articulated object in a sequence of image frames, in accordance with an embodiment of the disclosure. FIGS. 3A and 3B are described in conjunction with elements from FIGS. 1A, 1B, and 2. With reference to FIG. 3A, there is shown an image frame 302 of a video, a temporal derivative map 308 of the image frame 302, a scene segmentation map 310 of the image frame 302, and a first representation 312.

The image frame 302 includes a scene 302a captured by the image-capture circuitry 104, depicting a human object 304 that is to be tracked in the video, and a static background region 306. There is also shown non-zero temporal derivatives 308a in the temporal derivative map 308 and a set of super-pixels 310a in the scene segmentation map 310 of the image frame 302. The temporal derivative map 308 shows the non-zero temporal derivatives 308a of the human object 304 in a motion state when some portions (for example, legs and head portion in this case) of the human object 304 suddenly stops moving. The first representation 312 is shown to depict an exemplary view 314 of missing object boundaries and portions of the human object 304 before fading prevention. In accordance with the first exemplary scenario, the human object 304 may correspond to the articulated object 112 (FIG. 1A). The human object 304 may be a moving object. The image frame 302 may correspond to a newly captured image frame of the sequence of image frames 110 (FIG. 1A).

In operation, a camera module, such as the image-capture circuitry 104 of the image-processing apparatus 102 may capture the video, which may include the image frame 302. The image-capture circuitry 104 may communicate the captured video to the image-processing apparatus 102. In accordance with an embodiment, the image processor 202 may receive an input, such as the video captured in real time or near-real time to be processed, from the image-capture circuitry 104. In accordance with an embodiment, the image processor 202 may receive the input video to be processed from the server 106, by the network interface 210. Alternatively, the input video may be pre-stored in the memory 204. Thus, it is to be understood that the source of the input video may vary.

The image processor 202 may be configured to compute the temporal derivative map 308 from three sequential image frames, which includes the image frame 302 and two other image frames that precedes (not shown) the image frame 302. The temporal derivative map 308 may include the non-zero temporal derivatives 308a that may corresponds to displaced pixels of the upper body portion (for example, torso) of the human object 304. The use of three-sequential frames may significantly reduce shaking noise, for example, a smearing, which may come from the image-capture circuitry 104, such as a RGB camera. The image processor 202 may be configured to segment the scene 302a of the image frame 302 in a color space into different segmented regions that corresponds to the set of super-pixels 310a. Each super-pixel may be a polygonal segmented region of the image frame 302 represented in a pseudo color in the scene segmentation map 310, where different pseudo colors are shown by different line patterns in the FIG. 3A. For example, color of the roof, side walls, floor, furniture in the background 306 of the scene 302a may be different. Similarly, color of different body portion, such as hair, face, arms, clothing worn by the human object 304, may also be different. A pseudo color may refer to an assigned color to each polygonal segmented region for each corresponding original color present in the source scene, such as the scene 302a.

The image processor 202 may be configured to detect and segment the human object 304 based on the computed non-zero temporal derivatives 308a. However, as some portions (for example, legs and head portion in this case) of the human object 304 are stationary, non-zero temporal derivatives are not obtained for such stationary portions, and disappear, as shown by the exemplary view 314. Thereafter, the image processor 202 may be configured to rectify the object boundaries and restore the missing portion of the human object 304 in the image frame 302. The missing portion of the human object 304 may be restored based on a comparison of connectivity graphs of the image frame 302 and an image frame that precedes the image frame 302 in the video.

The super-pixels from the set of super-pixels 310a that are associated with the non-zero temporal derivatives 308a are classified as moving super-pixels. For example, the super-pixels 316b, 316c, 316d, 316e, and 316f may be initially classified as moving, whereas the super-pixel 316a may be classified as stationary. The image processor 202 may be configured to construct a connectivity graph of the first set of super-pixels 310a. The connectivity graph refers to a connectivity pattern of the set of super-pixels 310a. The connectivity graph identifies the adjacent segment regions (i.e. super-pixels) and their image properties (for example, color, texture, and geometry). The constructed connectivity graph of the set of super-pixels 310a is compared with previous connectivity graph of a set of super-pixels associated with the image frame that precedes the image frame 302. The image processor 202 may be configured to update the classification of the super-pixel 316a in the set of super-pixels 310a as moving based on a previous classification of the super-pixel 316a as moving in previously captured image frames of the video. The image processor 202 stores the associative information related to those super-pixels that were previously classified as moving in previously processed image frames of the video, in the memory 204. Even if some portions (for example, legs in this case) of the human object 304 become stationary in the video, still such stationary portions may be identified based on the connectivity graph (or connectivity pattern) analysis, and thus retained.

With reference to FIG. 3B, there is shown a complete object mask 318 in the image frame 302, and an object segregation result 320, such as the human object 304 delineated in the image frame 302. The image processor 202 may be configured to generate the complete object mask 318 of the human object 304 that is in the second motion state based on the analysis of the connectivity graphs. The complete object mask 318 of the human object 304 is generated based on the comparison of the constructed connectivity graph of the set of super-pixels 310a with previous connectivity graph of the set of super-pixels associated with the image frame that precedes the image frame 302. The image processor 202 may be configured to restore a missing portion of the articulated object 112, such as the super-pixel 316a, which may be in the second motion state in the second image frame 110b, based on the comparison. As described previously in the FIG. 3A, the portions (for example, legs that corresponds to the super-pixel 316a) of the human object 304 that suddenly stop moving and become stationary, leave no non-zero temporal derivatives and usually fade-out, as shown by the exemplary view 314 (FIG. 3A). Thus, the image processor 202 may be configured to rectify the object boundaries and restore the missing portion of the human object 304 in the image frame 302 based on the comparison of connectivity graphs, as shown in the complete object mask 318 of FIG. 3B. Thereafter, the object segmentation processor 206 may be configured to dynamically segment the human object 304, as shown by the object segregation result 320, based on the generated complete object mask 318. The connectivity graph may be updated with each new frame, reflecting the current appearance (i.e. current geometrical shape, brightness or color) of the moving object, such as the human object 304 in the video. Thus, once the object segmentation process is started, the object segmentation processor 206 may be configured to constantly update the connectivity graph, which is utilized for automatic and fail-safe tracking of each portion of the human object 304 even if the human object 304 changes its motion state from the first motion state to the second motion state and vice-versa in the video.

FIG. 3C illustrates a second exemplary scenario for implementation of the disclosed image-processing apparatus and method to track and retain an articulated object in a sequence of image frames, in accordance with an embodiment of the disclosure. FIG. 3C is described, for example, in conjunction with elements from FIGS. 1A, 1B, 2, 3A, and 3B. With reference to FIG. 3C, there is shown a first portion 304a, such as hair portion, of the human object 304 and a roof region 324a of the static background 306 in the scene 302a of the image frame 302. In accordance with the second exemplary scenario, the color of the first portion 304a, such as hairs, may coincide with the roof region 324a of the background 306 of the scene 302a. For example, color values of the first portion 304a of a foreground object, such as the human object 304, and the roof region 324a may be brown. Thus, in scene segmentation, as shown in the scene segmentation map 310, the first portion 304a and the roof region 324a may be placed into a same super-pixel, such as the super-pixel 324b. In such scenarios, initially, the image processor 202 may be configured to classify the super-pixel 324b as stationary in the image frame 302, as a small fraction of pixels (located in the first portion 304a) in the super-pixel 324b have non-zero temporal derivatives. Alternatively stated, the super-pixel 324b may include a first number of pixels in the first portion 304a that belong to the human object 304 and a second number of pixels in the roof region 324a that belong to a stationary background 306. The first number of pixels in the first portion 304a that belong to the human object 304 may be less than a threshold. The image processor 202 may be configured to identity or otherwise determine that the first number of pixels in the first portion 304a were previously associated with non-zero temporal derivatives. The identification may be done based on the analysis of connectivity graphs (described in FIG.

3A) and the stored associative information related to the super-pixels that were previously classified as moving in previously processed image frames of the video, in the memory 204. Thus, the image processor 202 may be configured to update scene segmentation parameters, for example, a range of color values, for that specific segmented region, such as the super-pixel 324b, to divide the super-pixel 324b into two sub-regions, such as a first sub-region having non-zero temporal derivatives and a second sub-region not having the non-zero temporal derivatives. The connectivity graph of set of super-pixels of previous images frame (image frames that precedes the image frame 302 in the video) may facilitate the decision making for the further division of the super-pixel 324b. Thus, each portion of the human object 304 (i.e. an articulated object) is tracked accurately and fail-safe by the image processor 202 independent of a motion state of the human object 304 in the video. In accordance with an embodiment, if two parts of an articulated object, merge (for example, one hand placed over another hand of the human object 304) or separate over a period of time in the video, the image processor 202 may still track the articulated object based on the connectivity graphs.

Figure 4A:
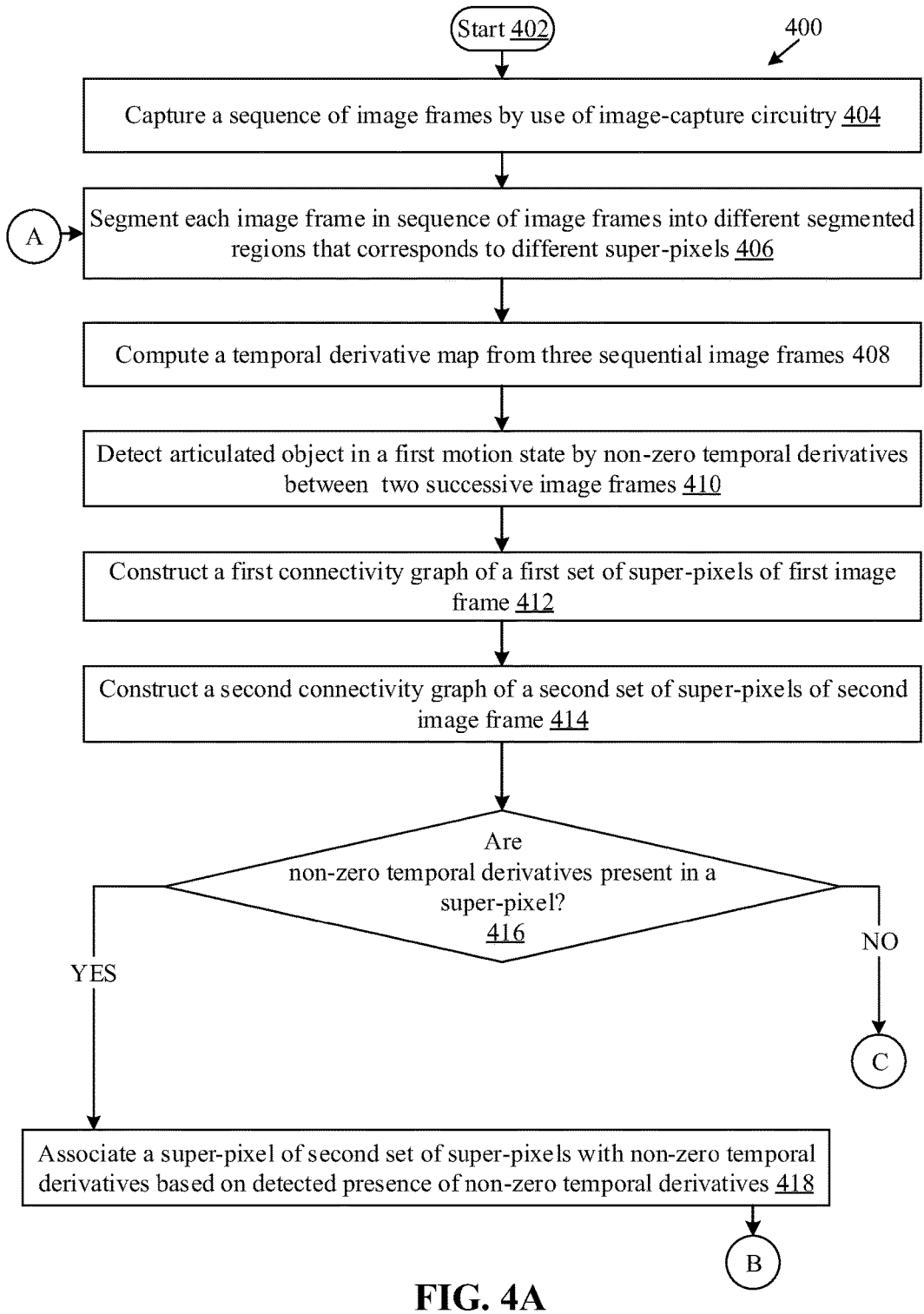
FIGS. 4A, 4B, and 4C, collectively, depict a flow chart that illustrates an exemplary method to track and retain an articulated object in a sequence of image frames, in accordance with an embodiment of the disclosure.
Figure 4B:
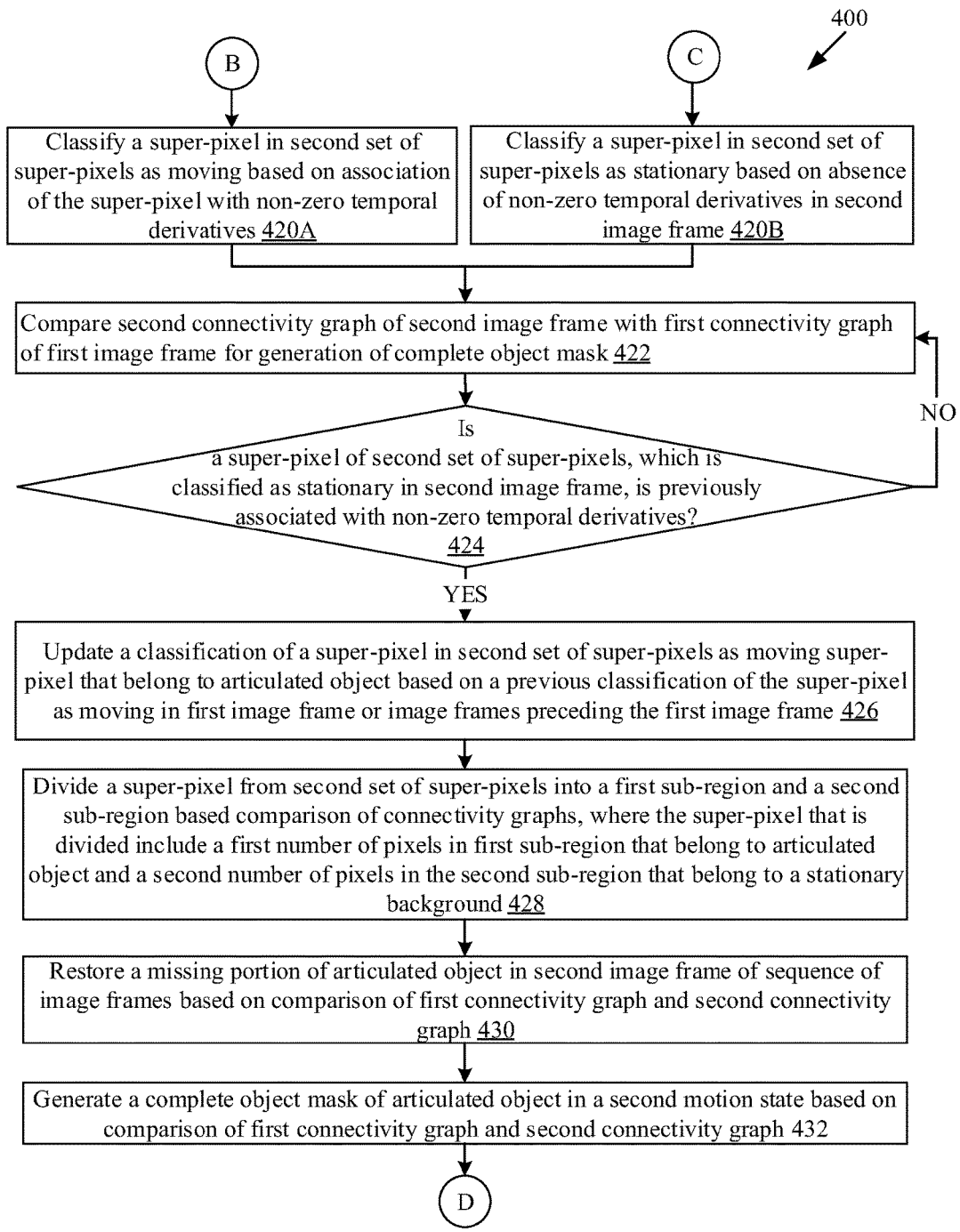
Figure 4C:
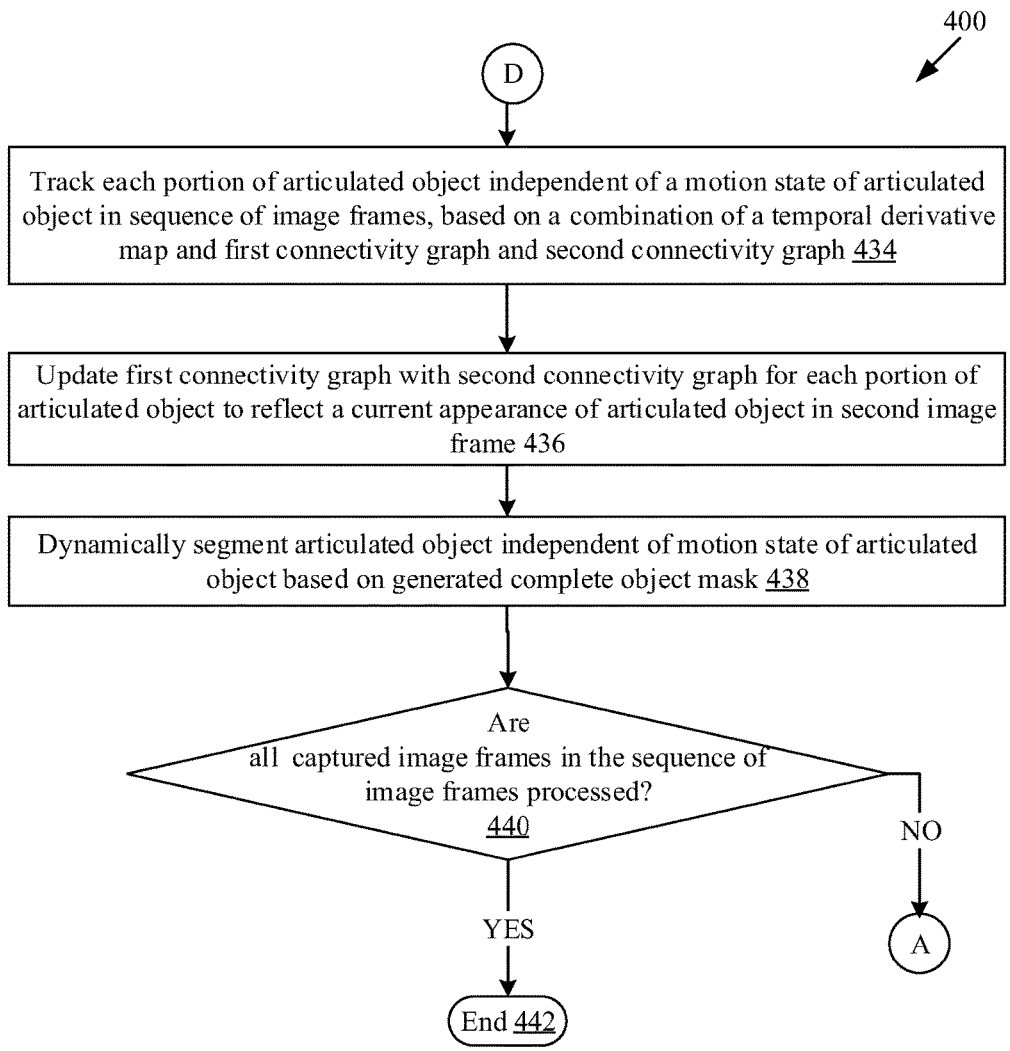

FIGS. 4A, 4B, and 4C, collectively, depict a flow chart that illustrates an exemplary method to track and retain an articulated object in a sequence of image frames, in accordance with an embodiment of the disclosure. With reference to FIGS. 4A, 4B, and 4C, there is shown a flow chart 400. The flow chart 400 implemented in the image-processing apparatus 102, is described in conjunction with elements from FIGS. 1A, 1B, 2, 3A, 3B, and 3C. The method starts at 402 and proceeds to 404.

At 404, the sequence of image frames 110, such as the input video, may be captured by use of the image-capture circuitry 104. The sequence of image frames 110 may include the first image frame 110a, the second image frame 110b (for example, the image frame 302), and other subsequent image frames 110c, . . . , 110n. The image processor 202 may be configured to capture the sequence of image frames 110 by use of the image-capture circuitry 104. The captured sequence of image frames 110 may include one or more objects, such as the articulated object 112, and a static background. An example of the articulated object 112 is a human object 304, as shown in FIG. 3A.

At 406, each image frame in the sequence of image frames 110 may be segmented into different segmented regions that corresponds to different super-pixels. The image processor 202 may be configured to segment each image frame in the sequence of image frames 110 into different segmented regions that corresponds to different super-pixels. The segmentation refers to scene segmentation, where a scene (for example, the scene 114a or the scene 302a) in each image frame of the sequence of image frames 110 is segmented in a color space, for example, a RGB color space. An example of the scene segmentation in the first image frame 110a is shown in the FIG. 1B, and another scene segmentation in a next image frame (for example, the image frame 302) is shown in FIG. 3A. The same segmented regions or super-pixels are marked by a same color (or a pseudo color) across the sequence of image frames 110 when a scene in each successive image frames, such as a second image frame, of the sequence of image frames 110 is segmented in the color space.

At 408, a temporal derivative map may be computed from three sequential image frames of the sequence of image frames 110. The image processor 202 may be configured to compute the temporal derivative map by use of three sequential image frames, for example, the first image frame 110a, the second image frame 110b, and the third image frame 110c. The use of three-sequential frames may significantly reduce shaking noise that may come from the image-capture circuitry 104, such as a RGB camera. The temporal derivative map may include zero and non-zero temporal derivatives. The zero temporal derivatives indicate no movement, whereas non-zero temporal derivatives indicates movement of pixels, i.e. displaced pixels. An example of the non-zero temporal derivatives 308a in the image frame 302 of the video is shown and described in FIG. 3A.

At 410, the articulated object 112 in the first motion state may be detected by non-zero temporal derivatives between at least the first image frame 110a and the second image frame 110b. The second image frame 110b may succeed the first image frame 110a in the sequence of image frames 110. The use of non-zero temporal derivatives allows to detect an object, such as the articulated object 112, by its movement. An example of the second image frame 110b is the image frame 302, as shown and described in FIG. 3A. The image processor 202 may be configured to detect the articulated object 112 in the first motion state by the non-zero temporal derivatives between at least the first image frame 110a and the second image frame 110b. The first motion state corresponds to a motion state of the articulated object 112 when the articulated object 112 or all the parts of the articulated object 112 are in motion. Alternatively stated, a motion state of the articulated object 112 may change from the first motion state to a second motion state. The first motion state corresponds to a motion state of the articulated object 112 when the articulated object 112 or all the parts of the articulated object 112 are in motion. In conventional methods, a "fading-out" problem is encountered when an attempt is made to track an object, such as the articulated object 112, solely by use of the non-zero temporal derivatives. For example, the articulated object 112 or some parts of the articulated object 112 may suddenly stop moving. Alternatively stated, a motion state of the articulated object 112 may change from the first motion state to a second motion state. The second motion state corresponds to a changed motion state of the articulated object 112 when the articulated object 112 or some parts of the articulated object 112 become stationary (i.e. stop moving) in the sequence of image frames 110. In such cases, connectivity graphs in a scene-segmented map are used to retain the complete object and prevent the object fading problem.

At 412, a first connectivity graph of the first set of super-pixels 116a of the first image frame 110a, may be constructed. The image processor 202 may be configured to construct the first connectivity graph of the first set of super-pixels 116a of the first image frame 110a. Each of the first set of super-pixels 116a corresponds to a polygonal segmented region of the different segmented regions of the first image frame 110a. Each super-pixel comprise a group of pixels with same or similar image properties, such as brightness or color. The first connectivity graph identifies co-relation of each segmented region (i.e. each super-pixel) with adjacent segmented regions (i.e. adjacent super-pixels).

At 414, a second connectivity graph of a second set of super-pixels of the second image frame 110b, may be constructed. The image processor 202 may be configured to construct the second connectivity graph of the second set of super-pixels of the second image frame 110b. The second connectivity graph refers to a connectivity pattern of the second set of super-pixels. An example of the second set of super-pixels is the set of super-pixels 310a of the image frame 302, as shown and described in the FIG. 3A.

At 416, it may be checked whether non-zero temporal derivatives are present in a super-pixel of the second set of super-pixels. The image processor 202 may be configured to check whether non-zero temporal derivatives are present in a super-pixel of the second set of super-pixels in the second image frame 110b. In cases where a super-pixel of the second set of super-pixels contain the non-zero temporal derivatives, the control may pass to 418. In cases where a super-pixel of the second set of super-pixels do not contain the non-zero temporal derivatives, the control may pass to 420B.

At 418, a super-pixel of the second set of super-pixels may be associated with the non-zero temporal derivatives. The image processor 202 may be configured to associate a super-pixel of the second set of super-pixels with the non-zero temporal derivatives. The association may be done based on a presence of the non-zero temporal derivatives in the super-pixel, which corresponds to a segmented region of the different segmented regions. At 420A, a super-pixel in the second set of super-pixels may be classified as moving based on an association of the super-pixel with the non-zero temporal derivatives. The image processor 202 may be configured to classify a super-pixel in the second set of super-pixels as moving. The image processor 202 may be further configured to continuously store the associative information related to those super-pixels that are currently and previously classified as moving (in currently and previously processed image frames) in the memory 204.

At 420B, a super-pixel in the second set of super-pixels may be classified as stationary based on an absence of the non-zero temporal derivatives in the second image frame 110b. The image processor 202 may be configured to classify a super-pixel in the second set of super-pixels as stationary based on an absence of the non-zero temporal derivatives in the second image frame 110b.

At 422, the second connectivity graph of the second image frame 110b may be compared with the first connectivity graph of the first image frame 110a for generation of a complete object mask. The image processor 202 may be configured to compare the second connectivity graph of the second image frame 110b with the first connectivity graph of the first image frame 110a for the generation of the complete object mask. Even if some portions (or parts) of the human object 304 become stationary in the sequence of image frames 110, still such stationary portions may be identified based on the connectivity graphs (or connectivity pattern) analysis, and thus retained.

At 424, it may be determined whether a super-pixel of the second set of super-pixels, which is classified as stationary in the second image frame 110b, is previously associated with the non-zero temporal derivatives. The image processor 202 may be configured to determine whether a super-pixel of the second set of super-pixels, which is classified as stationary in the second image frame 110b, is previously associated with the non-zero temporal derivatives. In cases where the super-pixel of the second set of super-pixels, which is currently classified as stationary in the second image frame 110b, is previously associated with the non-zero temporal derivatives, the control may pass to 426, else may return to 422.

At 426, a classification of a super-pixel in the second set of super-pixels may be updated as moving super-pixel that belong to the articulated object 112. The image processor 202 may be configured to update a classification of a super-pixel in the second set of super-pixels as moving super-pixel that belong to the articulated object 112. The classification of the super-pixel may be updated based on a previous classification of the super-pixel as moving in the first image frame 110a or the image frames that precedes the first image frame 110a. The classification of the super-pixel may be updated even if the non-zero temporal derivatives are absent from the super-pixel in the second image frame 110b based on the previous classification as read from the stored associative in the memory 204.

At 428, a super-pixel of the second set of super-pixels, may be divided into a first sub-region and a second sub-region. The division may be done based on connectivity graphs. The super-pixel that is divided may include a first number of pixels in the first sub-region that belong to the articulated object and a second number of pixels in the second sub-region that belong to a stationary background. The first number of pixels in the first sub-region may be less than a threshold number. The image processor 202 may be configured to divide the super-pixel of the second set of super-pixels into the first sub-region and the second sub-region. An example of the division of the super-pixel 324b and the decision making for such devising, is shown described in the FIG. 3C. The image processor 202 may be configured to update segmentation parameters for the super-pixel for the division of the super-pixel into the first sub-region and the second sub-region.

At 430, a missing portion of the articulated object 112 in the second image frame 110b of the sequence of image frames 110 may be restored. The image processor 202 may be configured to restore a missing portion of the articulated object 112 in the second image frame 110b of the sequence of image frames 110. The missing portion of the articulated object 112 may be restored based on the comparison of the first connectivity graph and the second connectivity graph. For example, as shown in the exemplary view 314 of FIG. 3A, some portions (for example, legs and head portion in this case) of the human object 304 are stationary. Thus, non-zero temporal derivatives are not obtained for such stationary portions, and disappear, as shown in the exemplary view 314. Thereafter, the image processor 202 may be configured to rectify the object boundaries and restore the missing portion of the human object 304 in the image frame 302 as shown in the FIG. 3B. The missing portion of the human object 304 is restored based on a comparison of connectivity graphs of the image frame 302 and an image frame that precedes the image frame 302 in the video.

At 432, a complete object mask of the articulated object 112 in the second motion state may be generated based on the comparison of the first connectivity graph and the second connectivity graph. At least a portion of the articulated object 112 may be stationary in the second motion state. An example of the complete object mask 318 of the human object 304 that is in the second motion state is shown in FIG. 3B. Once the missing portions of the human object 304 are restored, the complete object mask 318 may be generated.

At 434, each portion of the articulated object 112 may be tracked independent of a motion state of the articulated object 112 in the sequence of image frames 110. A robust and accurate tracking of each portion of the articulated object 112 is done by use of the generated temporal derivative map, the first connectivity graph, and the second connectivity graph.

At 436, the first connectivity graph may be updated with the second connectivity graph for each portion of the articulated object 112 to reflect a current appearance of the articulated object 112 in the second image frame 110b. The image processor 202 may be configured to update the first connectivity graph with the second connectivity graph for each portion of the articulated object 112. Similar to the second image frame 110b, the connectivity graph may be updated with each new frame, reflecting the current appearance of the moving object, such as the articulated object 112, in the sequence of image frames 110.

At 438, the articulated object 112 may be dynamically segmented from the background of the second image frame 110b, based on the generated complete object mask. The object segmentation processor 206 may be configured to dynamically segment the articulated object 112 from the background of the second image frame 110b, based on the generated complete object mask. An example of the object segmentation of the human object 304 from the background 306 in the image frame 302 is shown and described in the FIG. 3B. The object segmentation processor 206 may be configured to utilize the generated complete object mask for the object segmentation. Thus, once the object segmentation process is started, the object segmentation processor 206 may be configured to constantly segment the articulated object 112 in the sequence of image frames 110 even if the articulated object 112 (for example the human object 304) changes its motion state from the first motion state to the second motion state and vice-versa. Alternatively stated, the object segmentation may occur even if one or more parts or the articulated object 112 as a whole stop moving, or become deformed over a period of time in the sequence of image frames 110.

At 440, it may be checked whether all captured image frames of the sequence of image frames 110 are processed. In cases where all the image frames of the sequence of image frames 110 are not processed, control may return to 406 to repeat the scene segmentation, object detection and segmentation phase for a next image frame, such as the third image frame 110c. The process may repeat unit all the sequence of the image frames 110 are processed. In cases where all the image frames of the sequence of image frames 110 are processed, the control may then pass to end 442.

In accordance with an embodiment of the disclosure, an image-processing system to track and retain an articulated object in a sequence of image frames is disclosed. The image-processing system may include the image-processing apparatus 102 (FIG. 1A), which may comprise at least one image processor (such as the image processor 202 and/or the object segmentation processor 206 (FIG. 2)). The image processor 202 may be configured to segment each image frame in the sequence of image frames 110 into different segmented regions that corresponds to different super-pixels. The image processor 202 may be configured to detect an articulated object in a first motion state (e.g. all parts may be in motion) by non-zero temporal derivatives between the first image frame 110a and the second image frame 110b that succeeds the first image frame 110a in the sequence of image frames 110. The image processor 202 may be further configured to construct a first connectivity graph of the first set of super-pixels 116a of the first image frame 110a. The image processor 202 may be further configured to construct a second connectivity graph of a second set of super-pixels (such as the set of super-pixels 310a) of the second image frame 110b (e.g. the image frame 302). The image processor 202 may be further configured to generate a complete object mask of the articulated object 112 in a second motion state in the second image frame 110b based on the first connectivity graph and the second connectivity graph, where at least a portion (or a part) of the articulated object 112 is stationary in the second motion state (e.g. a part or the entire object may stop moving in the second motion state).

The disclosed image-processing apparatus 102 to process the sequence of image frames 110, such as a video, may be implemented in various application areas, such as video surveillance or tracking for moving articulated objects, deforming objects (non-rigid deformations), or articulated objects that change orientations at different time instances while an input video is captured. The disclosed image-processing apparatus 102 and method may be suited for a real-world tracking application, such as video surveillance of human beings or other articulated objects, object tracking in a gaming system, or other real time or near-real time object detection and segmentation for such moving objects that change its motion state over a period of time, for example, suddenly stops moving.

There are certain requirements of the motion-based object segmentation and challenges to achieve an accurate segmentation of a moving object, such as the articulated object 112. For example, a) sensitivity to minute movements of a moving object (often at a unit level, i.e. a pixel level); b) tolerance to the camera's shaking noise; c) ability to effectively work with fast moving objects (e.g. large number of pixels between frames); d) ability to track homogeneous interior areas of the moving object; and e) ability to work under changing light conditions. The disclosed image-processing apparatus 102 and the method to track and retain the articulated object 112 in the sequence of image frames 110 fulfills the above requirements and solves the above challenges of the motion-based object segmentation. The disclosed image-processing apparatus 102 and method is sensitive to the movements at a pixel level of a super-pixel. As a scene of each image frame is segmented into different super-pixels that contains many pixels, a pixel level sensitivity to the motion of the articulated object 112 is provided by use of the temporal derivatives. The shaking noise in the temporal derivatives is eliminated by subtracting a global movement of the image-capture circuitry 104 (i.e. the camera). The connectivity graphs constructed by the image processor 202 allows to tolerate the fast movement of the moving articulated object or its parts, while handling a certain amount of motion blur. Further, the super-pixel approach solves the tracking problem of tracking the homogeneous areas in the moving object, such as the articulated object 112. Further, the connectivity graphs constructed by the image processor 202 are not sensitive to changes in lighting conditions, also referred to as global lights.

The operations performed by the image-processing apparatus 102 make the image-processing apparatus 102 itself more robust in articulated object 112 detection and segmentation independent of a changing motion state of the articulated object 112 as compared to conventional methods of video segmentation. In contrast to the conventional and common approach of motion-based tracking and segmentation of the articulated object 112 in a video, the image-processing apparatus 102 may be configured to track each portion of the articulated object 112 independent of a motion state of the articulated object 112 in the sequence of image frames 110, based on a combination of the computed temporal derivative map and an independent scene-segmented map. Thus, the object segmentation processor 206 enables the image-processing apparatus 102 to segment desired objects, such as the human object 304, and segment them out in real time or near real time in a fully-automatic manner (with no user input). The result, such as the segmented object is produced immediately after a new image of the input video is captured. Thus, once the object segmentation process is started, the object segmentation processor 206 may be configured to constantly segment the articulated object 112 in the sequence of image frames 110 even if the articulated object 112 (for example the human object 304) or some parts (or portions) of the articulated object 112 changes its motion state from the first motion state to the second motion state or vice-versa.

Various embodiments of the disclosure may provide a non-transitory computer readable medium and/or storage medium, where there is stored therein, a set of instructions executable by a machine and/or a computer to track and retain an articulated object in a sequence of image frames (such as the sequence of image frames 110). The set of instructions may cause the machine and/or computer to segment each image frame in the sequence of image frames 110 into different segmented regions that corresponds to different super-pixels. An articulated object in a first motion state may be detected by non-zero temporal derivatives between the first image frame 110a and the second image frame 110b that succeeds the first image frame 110a in the sequence of image frames 110. A first connectivity graph of the first set of super-pixels 116a of the first image frame 110a, may be constructed. A second connectivity graph of a second set of super-pixels (such as the set of super-pixels 310a) of the second image frame 110b (e.g. the image frame 302), may also be constructed. A complete object mask of the articulated object 112 may be generated in a second motion state based on the first connectivity graph and the second connectivity graph, where at least a portion (or a part) of the articulated object 112 is stationary in the second motion state (e.g. a part or the entire object may stop moving).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An image-processing apparatus, comprising:
at least one image processor configured to:
segment each image frame in a sequence of image frames into different segmented regions that corresponds to different super-pixels;
detect an articulated object in a first motion state by non-zero temporal derivatives between a first image frame and a second image frame that succeeds said first image frame in said sequence of image frames;
construct a first connectivity graph of a first set of super-pixels of said first image frame;
construct a second connectivity graph of a second set of super-pixels of said second image frame; and
generate a complete object mask of said articulated object in a second motion state based on said first connectivity graph and said second connectivity graph, wherein at least a portion of said articulated object is stationary in said second motion state.

2. The image-processing apparatus according to claim 1, wherein said at least one image processor is further configured to compare said second connectivity graph of said second image frame with said first connectivity graph of said first image frame for said generation of said complete object mask.

3. The image-processing apparatus according to claim 1, wherein said at least one image processor is further configured to compute a temporal derivative map from three sequential image frames that include said first image frame and said second image frame, wherein said temporal derivative map includes at least said non-zero temporal derivatives.

4. The image-processing apparatus according to claim 1, wherein said at least one image processor is further configured to associate a super-pixel of said first set of super-pixels or said second set of super-pixels with said non-zero temporal derivatives based on a presence of said non-zero temporal derivatives in said super-pixel, which corresponds to a segmented region of said different segmented regions, wherein said super-pixel associated with said non-zero temporal derivatives in entirety is included in said complete object mask.

5. The image-processing apparatus according to claim 1, wherein said at least one image processor is further configured to classify a super-pixel in said first set of super-pixels or said second set of super-pixels as moving, based on an association of said super-pixel with said non-zero temporal derivatives.

6. The image-processing apparatus according to claim 1, wherein said at least one image processor is further configured to update a classification of a super-pixel in said second set of super-pixels as a moving super-pixel that belong to said articulated object based on a previous classification of said super-pixel as moving in said first image frame and an absence of said non-zero temporal derivatives in said second image frame.

7. The image-processing apparatus according to claim 1, wherein said at least one image processor is further configured to divide a super-pixel of said second set of super-pixels into a first sub-region and a second sub-region, wherein said super-pixel include a first number of pixels in said first sub-region that belong to said articulated object and a second number of pixels in said second sub-region that belong to a stationary background.

8. The image-processing apparatus according to claim 7, wherein said at least one image processor is further configured to update segmentation parameters for said super-pixel for said division of said super-pixel into said first sub-region and said second sub-region, wherein said first number of pixels in said first sub-region is less than a threshold number.

9. The image-processing apparatus according to claim 7, wherein said at least one image processor is further configured to check whether a super-pixel of said second set of super-pixels, which is classified as stationary in said second image frame, is previously associated with said non-zero temporal derivatives for said division of said super-pixel.

10. The image-processing apparatus according to claim 1, wherein said at least one image processor is further configured to update said first connectivity graph with said second connectivity graph for each portion of said articulated object to reflect a current appearance of said articulated object in said second image frame.

11. The image-processing apparatus according to claim 1, wherein said at least one image processor is further configured to track each portion of said articulated object independent of a motion state of said articulated object in said sequence of image frames, based on a combination of a temporal derivative map and said first connectivity graph and said second connectivity graph.

12. The image-processing apparatus according to claim 1, wherein said at least one image processor is further configured to restore a missing portion of said articulated object in said second image frame of said sequence of image frames for said generation of said complete object mask, based on a comparison of said first connectivity graph and said second connectivity graph.

13. An object tracking method in a sequence of image frames, comprising:
   in an image-processing apparatus that comprises at least one image processor:
      segmenting, by said at least one image processor, each image frame in a sequence of image frames into different segmented regions that corresponds to different super-pixels;
      detecting, by said at least one image processor, an articulated object in a first motion state by non-zero temporal derivatives between a first image frame and a second image frame that succeeds said first image frame in said sequence of image frames;
      constructing, by said at least one image processor, a first connectivity graph of a first set of super-pixels of said first image frame;
      constructing, by said at least one image processor, a second connectivity graph of a second set of super-pixels of said second image frame; and
      generating, by said at least one image processor, a complete object mask of said articulated object in a second motion state based on said first connectivity graph and said second connectivity graph, wherein at least a portion of said articulated object is stationary in said second motion state.

14. The method according to claim 13, further comprising comparing, by said at least one image processor, said second connectivity graph of said second image frame with said first connectivity graph of said first image frame for said generation of said complete object mask.

15. The method according to claim 13, further comprising computing, by said at least one image processor, a temporal derivative map from three sequential image frames that include said first image frame and said second image frame, wherein temporal derivative map includes at least said non-zero temporal derivatives.

16. The method according to claim 13, further comprising associating, by said at least one image processor, a super-pixel of said first set of super-pixels and said second set of super-pixels with said non-zero temporal derivatives based on a presence of said non-zero temporal derivatives in said super-pixel, which corresponds to a segmented region of said different segmented regions, wherein said super-pixel associated with said non-zero temporal derivatives in entirety is included in said complete object mask.

17. The method according to claim 13, further comprising classifying, by said at least one image processor, a super-pixel in said first set of super-pixels and said second set of super-pixels as moving, based on an association of said super-pixel with said non-zero temporal derivatives.

18. The method according to claim 13, further comprising updating, by said at least one image processor, a classification of a super-pixel in said second set of super-pixels as an object super-pixel that belong to said articulated object based on a previous classification of said super-pixel as moving in said first image frame and an absence of said non-zero temporal derivatives in said second image frame.

19. The method according to claim 13, further comprising dividing, by said at least one image processor, a super-pixel of said second set of super-pixels into a first sub-region and a second sub-region, wherein said super-pixel include a first number of pixels in said first sub-region that belong to said articulated object and a second number of pixels in said second sub-region that belong to a stationary background.

20. The method according to claim 19, further comprising updating, by said at least one image processor, segmentation parameters for said super-pixel for said division of said super-pixel into said first sub-region and said second sub-region, wherein said first number of pixels in said first sub-region is less than a threshold number.

21. The method according to claim 19, further comprising checking, by said at least one image processor, whether a super-pixel of said second set of super-pixels, which is classified as stationary in said second image frame, is previously associated with said non-zero temporal derivatives for said division of said super-pixel.

22. The method according to claim 13, further comprising updating, by said at least one image processor, said first connectivity graph with said second connectivity graph for each portion of said articulated object to reflect a current appearance of said articulated object in said second image frame.

23. The method according to claim 13, further comprising tracking, by said at least one image processor, each portion of said articulated object independent of a motion state of said articulated object in said sequence of image frames, based on a combination of a temporal derivative map and said first connectivity graph and said second connectivity graph.

24. The method according to claim 13, further comprising restoring, by said at least one image processor, a missing portion of said articulated object in said second image frame of said sequence of image frames for said generation of said complete object mask, based on a comparison of said first connectivity graph and said second connectivity graph.

* * * * *